(12) United States Patent
Rimini et al.

(10) Patent No.: US 10,069,587 B1
(45) Date of Patent: Sep. 4, 2018

(54) MITIGATION OF INTERFERENCE CAUSED BY A TRANSMITTER

(71) Applicant: QUALCOMM Incorporated, San Diego, CA (US)

(72) Inventors: Roberto Rimini, San Diego, CA (US); Sheng-Yuan Tu, San Diego, CA (US); Nicola Varanese, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/612,891

(22) Filed: Jun. 2, 2017

(51) Int. Cl.
*H04B 1/00* (2006.01)
*H04J 11/00* (2006.01)
*H04B 1/10* (2006.01)

(52) U.S. Cl.
CPC ........ *H04J 11/0023* (2013.01); *H04B 1/1027* (2013.01)

(58) Field of Classification Search
CPC ........................... H04J 11/0023; H04B 1/1027
See application file for complete search history.

(56) References Cited

U.S. PATENT DOCUMENTS

| | | | |
|---|---|---|---|
| 9,264,081 B1* | 2/2016 | Cedergren | H04B 1/1027 |
| 2008/0043888 A1* | 2/2008 | Bhukania | H04L 25/03006 375/346 |
| 2009/0310724 A1* | 12/2009 | Shah | H04B 7/0854 375/346 |
| 2012/0231739 A1* | 9/2012 | Chen | H04B 7/026 455/41.2 |
| 2014/0269850 A1* | 9/2014 | Abdelmonem | H04L 5/0026 375/148 |
| 2017/0111069 A1* | 4/2017 | Dafesh | H04B 1/1027 |

* cited by examiner

*Primary Examiner* — Dac Ha

(57) ABSTRACT

In aspects, apparatus and methods of wireless communication, and more specifically of improved mitigation of interference caused by a transmitter are provided. For example, in aspects, a method of interference mitigation of wireless communication is provided including transmitting at least one transmit signal from at least one transmit chain of a user equipment (UE) over a wireless medium, receiving a composite signal that includes a desired receive signal transmitted from a device and a distortion signal, generating a modified composite signal by removing at least a portion of the desired receive signal from the composite signal, generating a distortion signal estimate based on the modified composite signal, and canceling the distortion signal estimate from the composite signal. Numerous other aspects are provided.

19 Claims, 9 Drawing Sheets

MITIGATION OF INTERFERENCE CAUSED BY A TRANSMITTER

FIELD OF DISCLOSURE

The following relates generally to wireless communication, and more specifically to improved mitigation of interference caused by a transmitter.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Certain wireless communication systems may use one or more analog transmission waveforms and/or reception waveforms. For example, transmitting devices, such as a UE and/or a base station, may include one or more transmit chains that each generate an analog waveform for transmission. A receive chain of the transmitting device, however, may experience difficulty with concurrent or simultaneous receive operations due to interference or distortion introduced by a transmission, such as from the transmit chain(s). For example, non-linear and/or linear behavior of the analog radio frequency (RF) component(s) of the transmit chain (e.g., power amplifier, switches, antenna tuners, etc.) may generate undesired energy in other portions of the spectrum. This undesired energy may be considered interference when received at the receive chain(s). In some aspects, this effect may be considered transmitter self-jamming. For the case of a single transmit carrier, the distortion may manifest as harmonics of the fundamental operating frequency. In an example where uplink carrier aggregation (UL-CA) techniques are used, the distortion may manifest as inter-modulation distortion (IMD) where a combination of two transmit frequencies may fall at the receive frequency. The resultant co-channel interference can significantly de-sensitize the receiver.

As downlink received signal strength indicator (RSSI) of a received signal increases, conventional techniques for canceling interference from the received signal become less efficient and/or may actually introduce noise to the received signal. There is hence a need to provide improved mitigation of interference caused by a transmitter.

SUMMARY

The described features generally relate to one or more improved systems, methods and/or apparatuses for mitigation of interference caused by a transmitter. In aspects, a method of interference mitigation of wireless communication is described. In one configuration, the method may involve transmitting at least one transmit signal from at least one transmit chain from a UE over a wireless medium, receiving a composite signal that includes a desired receive signal transmitted from a device and a distortion signal, generating a modified composite signal by removing at least a portion of the desired receive signal from the composite signal, generating a distortion signal estimate based on the modified composite signal, and/or canceling the distortion signal estimate from the composite signal.

In aspects, an apparatus for interference mitigation of wireless communication is provided. The apparatus includes means for transmitting at least one transmit signal from at least one transmit chain from a UE over a wireless medium, means for receiving a composite signal that includes a desired receive signal transmitted from a device and a distortion signal, means for generating a modified composite signal by removing at least a portion of the desired receive signal from the composite signal, means for generating a distortion signal estimate based on the modified composite signal, and/or means for canceling the distortion signal estimate from the composite signal.

In aspects, another apparatus for interference mitigation of wireless communication is provided. The apparatus includes a processor and memory in electronic communication with the processor. The memory embodies instructions, the instructions being executable by the processor to transmit at least one transmit signal from at least one transmit chain from a UE over a wireless medium, receive a composite signal that includes a desired receive signal transmitted from a device and a distortion signal, generate a modified composite signal by removing at least a portion of the desired receive signal from the composite signal, generate a distortion signal estimate based on the modified composite signal, and/or cancel the distortion signal estimate from the composite signal.

In aspects, a non-transitory computer-readable medium for interference mitigation of wireless communication is provided. The non-transitory computer-readable medium stores computer-executable code for transmitting at least one transmit signal from at least one transmit chain from a UE over a wireless medium, receiving a composite signal that includes a desired receive signal transmitted from a device and a distortion signal, generating a modified composite signal by removing at least a portion of the desired receive signal from the composite signal, generating a distortion signal estimate based on the modified composite signal, and/or canceling the distortion signal estimate from the composite signal. Numerous other aspects are provided.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The described features generally relate to one or more improved systems, methods and/or apparatuses for mitigation of interference caused by a transmitter. At least one transmit signal may be transmitted from at least one transmit chain, for example, from a UE over a wireless medium. A composite signal that includes a desired receive signal transmitted from a device and a distortion signal may be received. A modified composite signal may be generated by removing at least a portion of the desired receive signal (e.g., received from a base station) from the composite signal. A distortion signal estimate may be generated based on the modified composite signal. The distortion signal estimate may be canceled from the composite signal.

The following description provides examples, and is not limiting of the scope, applicability, or configuration set forth in the claims. Changes may be made in the function and arrangement of elements discussed without departing from the scope of the disclosure. Various embodiments may omit, substitute, or add various procedures or components as appropriate. For instance, the methods described may be performed in an order different from that described, and various operations may be added, omitted, or combined. Also, features described with respect to certain embodiments may be combined in other embodiments.

Figure 1:
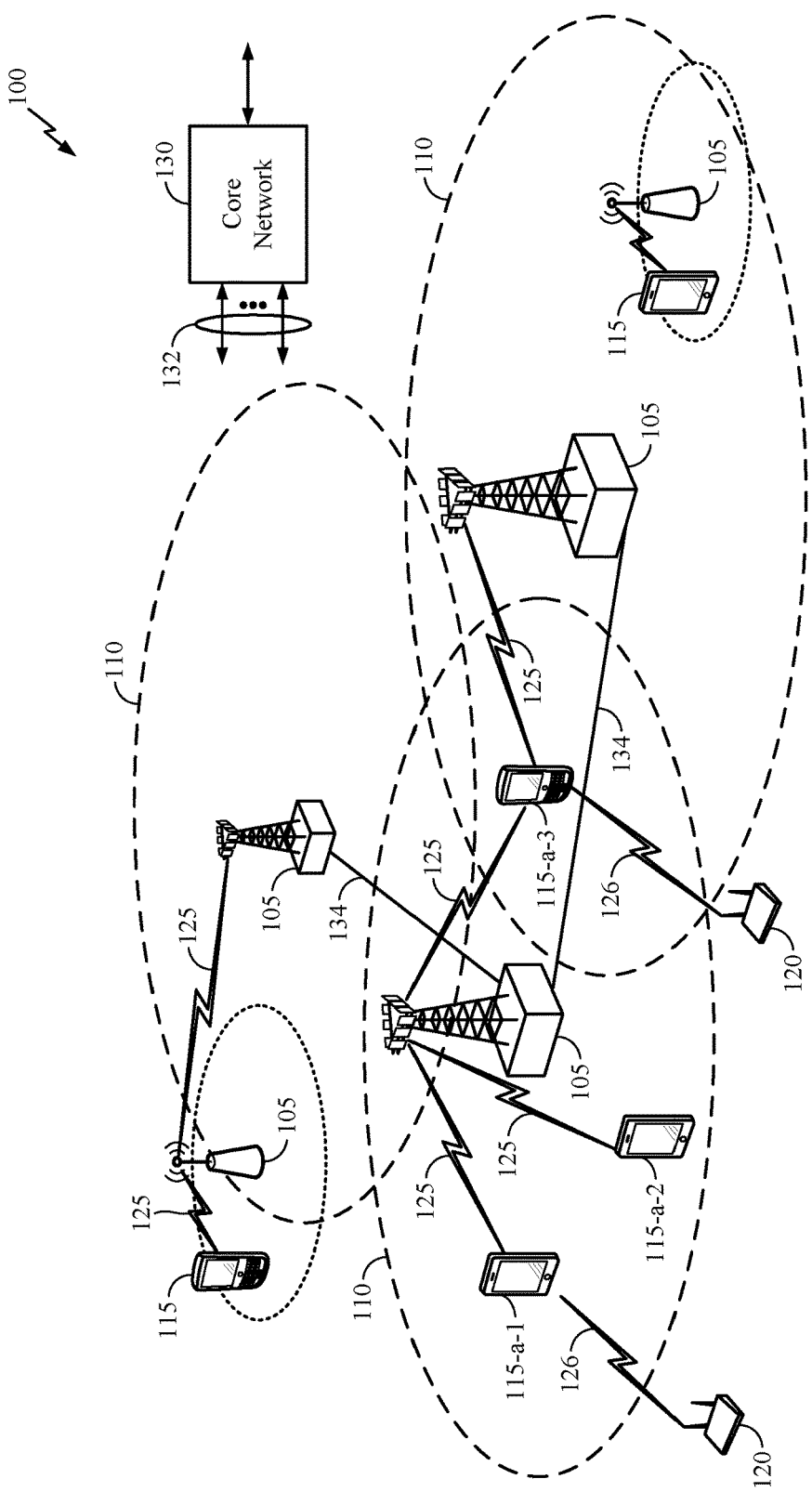
FIG. 1 shows a diagram of a wireless communications system in accordance with aspects of the present disclosure.

FIG. 1 illustrates an example of a wireless communications system 100 in accordance with various embodiments.

The system 100 includes base stations 105, communication devices, also known as user equipment UE 115, and a core network 130. The base stations 105 may communicate with the UEs 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Wireless communication links 125 may be modulated according to various radio technologies. Each modulated signal may carry control information (e.g., reference signals, control channels, etc.), overhead information, data, etc.

The base stations 105 may wirelessly communicate with the UEs 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, evolved node B (eNB), Home NodeB, Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

In embodiments, the system 100 is an LTE/LTE-A network. However, other RATs may implement one or more aspects described herein. In LTE/LTE-A networks, the terms evolved Node B (eNB) and UE may be generally used to describe the base stations 105 and devices 115, respectively. The system 100 may be a Heterogeneous Long Term Evolution (LTE)/LTE-A network in which different types of base stations provide coverage for various geographical regions. For example, each eNB 105 may provide communication coverage for a macro cell, a small cell, and/or other types of cell. The term "cell" is a 3GPP term that can be used to describe a base station, a carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station that may operate in the same or different (e.g., licensed, unlicensed, etc.) frequency bands as macro cells. Small cells include pico cells, femto cells, and micro cells. A pico cell would generally cover a relatively smaller geographic area and may allow unrestricted access by UEs with service subscriptions with the network provider. A femto cell would also generally cover a relatively small geographic area (e.g., a home) and may provide restricted access by UEs having an association with the femto cell (e.g., UEs in a closed subscriber group (CSG), UEs for users in the home, and the like).

The core network 130 may communicate with the base stations 105 via a backhaul 132 (e.g., S1, etc.). The base stations 105 may also communicate with one another, e.g., directly or indirectly via backhaul links 134 (e.g., X2, etc.) and/or via backhaul links 132 (e.g., through core network 130). The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The UEs 115 may be dispersed throughout the wireless communications system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communication links 125 shown in system 100 may be wireless wide area network (WWAN) connections, including uplink (UL) transmissions from a UE 115 to a base station 105, and/or downlink (DL) transmissions, from a base station 105 to a UE 115 over DL carriers. The downlink transmissions may also be called forward link transmissions while the uplink transmissions may also be called reverse link transmissions.

In addition to communicating with base stations 105 using the WWAN communication links 125, the UEs 115 may also employ different radio access technologies (RATs). For example, as illustrated in FIG. 1, UEs 115-a-1 and 115-a-3 are also configured to communicate with Wi-Fi access points 120 using a wireless local area network (WLAN) communication link 126. Alternatively, or in addition to using WLAN and/or WWAN RATs, one or more of the UEs 115 may use other RATs (such as Bluetooth or Global Positioning System signaling), and/or may utilize multiple types of WLAN or WWAN RATs (such as LTE with carrier aggregation, WCDMA, GSM, etc.). Generally, the UEs 115 may use two or more different types of RATs, and may include two or more antennas for use with the same or different types of RATs, as described in more detail below.

In some embodiments, the use of a first type of RAT may interfere with the use of a second type of RAT and/or with a separate connection using the first type of RAT. As one example, a WWAN transmit signal may cause distortion on a WWAN receive signal due to third order harmonics arising from non-linear components (e.g., a power amplifier, duplexer, etc.) in or associated with the WWAN transmitter. In this example, the WWAN transmit signal is the "aggressor" and the WWAN receive signal is the "victim." The distortion on the victim WWAN receive signal may be characterized by the distortion of the actual received signal as compared to what the received signal would have been without distortion caused by interference from the aggressor.

As another example, if a signal transmit channel associated with a WWAN transmit communication link 125 is adjacent signal receive channel associated with a WWAN receive communication link 125, adjacent channel leakage from the signal transmit path associated with the WWAN transmit communication link 125 may victimize the signal receive path associated with the WWAN receive communication link 125. As yet another example, for UEs 115 communicating using multiple WWANs, an intermodulation product of such communications using two or more WWAN communication links 125 may victimize a communication using a WWAN receive link 125 on one of the WWANs. As still another example, if the device employs full duplex transmission, imperfect transmit/receive isolation may cause victimization of the receive communications by the transmit communications. Generally speaking, any radio transmission may cause various types of interference with a separate but closely located (e.g., co-existing) radio reception. For example, in aspects, rather than experiencing distortion due to transmitting at least one transmit signal from at least one transmit chain from a UE over a wireless medium, the UE may experience distortion by being proximate another UE transmitting at least one transmit signal from its at least one transmit chain.

In some instances, a single device, such as a UE 115 or base station 105, may be the source of the aggressor/transmitted signal and also the receiver of the victim/received signal. Still referring to FIG. 1, for example, transmissions by the UE 115-a-3 over a WWAN communication link 125 may victimize signals received by the UE 115-a-3 over the same or a different WWAN communication link 125. An antenna used to transmit the aggressor signal may be the same or different from the antenna used to receive the victim signal. In other instances, a transmission by a second UE 115-a-2 over a WWAN communication link 125 may victimize (e.g., interfere with) a signal received using the WWAN communication link 125 for the first UE 115-a-1, causing distortion to the received signal that may affect decoding or other processing for correctly recovering the signal data.

In some instances, the multiple antennas may receive the same signal from a common transmitter, whereas in other instances, the multiple antennas may receive different signals from different transmitters or antennas (e.g., in a multiple-input-multiple-output or MIMO system). For example, and referring still to FIG. 1, the UE 115-a-1 may include two antennas for receiving a single WWAN signal over communication link 125. Another UE 115-a-3, however, may include two antennas for receiving two different WWAN signals from different base stations 105 over different WWAN communication links 125.

Figure 2:
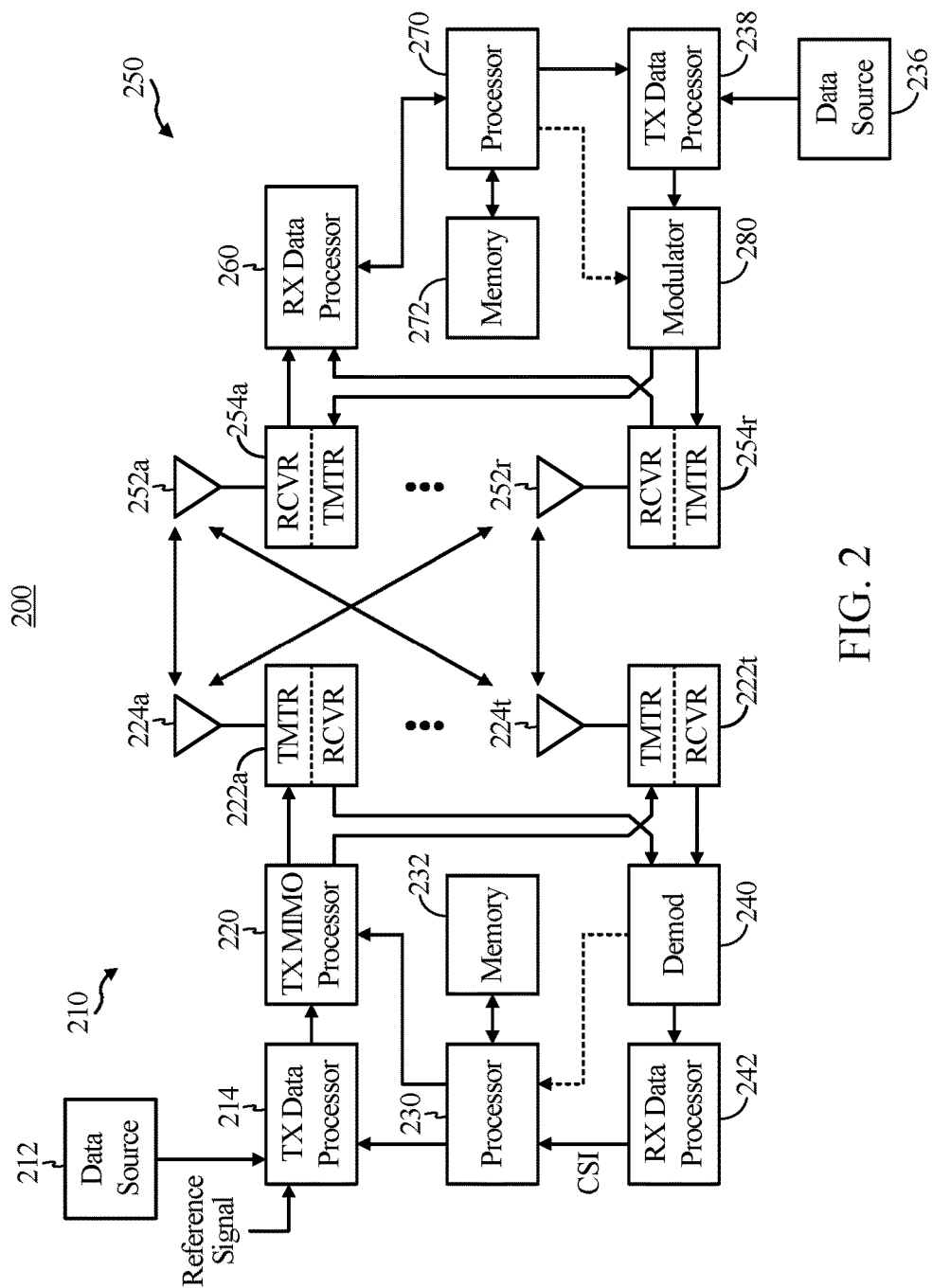
FIG. 2 shows a block diagram of a base station and a user equipment (UE) which may operate in accordance with aspects of the present disclosure.

FIG. 2 shows a block diagram of a base station and a user equipment (UE) which may operate in accordance with aspects of the present disclosure. A block diagram of an aspect of a transmitter system 210 (for example a base station) and a receiver system 250 (for example a UE) in a system 200, such as a MIMO system is illustrated, in which aspects of the present disclosure may be practiced. At the transmitter system 210, traffic data for a number of data streams is provided from a data source 212 to a transmit (TX) data processor 214. An aspect of the present disclosure is also applicable to a wire-line (wired) equivalent system of FIG. 2. In aspects, the transmitter system 210 may additionally or alternatively be a receiver system. In aspects, the receiver system 250 may additionally or alternatively be a transmitter system. In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., Binary Phase Shift Keying (BPSK), Quadrature Phase Shift Keying (QPSK), M-PSK in which M may be a power of two, or M-QAM (Quadrature Amplitude Modulation)) selected for that data stream to provide modulation symbols. The data rate, coding and modulation for each data stream may be determined by instructions performed by processor 230 that may be coupled with a memory 232.

The modulation symbols for all data streams are then provided to a TX MIMO processor 220, which may further process the modulation symbols (e.g., for OFDM). TX MIMO processor 220 then provides $N_t$ modulation symbol streams to $N_t$ transmitters (TMTR), which may be part of $N_t$ transceivers 222a through 222t. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_t$ modulated signals from transmitters 222a through 222t are then transmitted from $N_t$ antennas 224a through 224t, respectively.

At receiver system 250, the transmitted modulated signals are received by $N_r$ antennas 252a through 252r and the received signal from each antenna 252 is provided to a respective receiver 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_r$ received symbol streams from $N_r$ receivers 254 based on a particular receiver processing technique to provide $N_t$ "detected" symbol streams. The RX data processor 260 then demodulates, deinterleaves and decodes each detected symbol stream to recover the traffic data for the data stream. The processing by RX data processor 260 is complementary to that performed by TX MIMO processor 220 and TX data processor 214 at transmitter system 210. As described in further detail below, the RX data processor 260 may utilize interference suppression, mitigation and/or cancellation to reduce and/or eliminate the interference on the received signal.

Processor 270, coupled to a memory 272, formulates a reverse link message. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers (RCVR) 222, demodulated by a demodulator 240 and processed by a RX data processor 242 to extract the reserve link message transmitted by the receiver system 250. According to certain aspects of the present disclosure, the transmitter system 210 and/or the receiver system 250 may comprise one or more components of wireless communication devices 500, 700 and/or 800 described below and illustrated in FIGS. 5, 7, and 8. According to certain aspect of the present disclosure, the processor 270, the transceivers 254 and/or other processors, components, and modules at the receiver system 250 may perform or direct operations 600 for improved mitigation of interference caused by a transmitter in FIG. 6 and/or other processes for the techniques described herein. According to certain aspect of the present disclosure, the processor 230, the transceivers 222 and/or other processors, components, and modules at the transmitter system 210 may perform or direct operations 600 in FIG. 6 and/or other processes for the techniques described herein. However, any module, component and/or processor in FIG. 2 may perform the processes for the techniques described herein.

Figure 3:
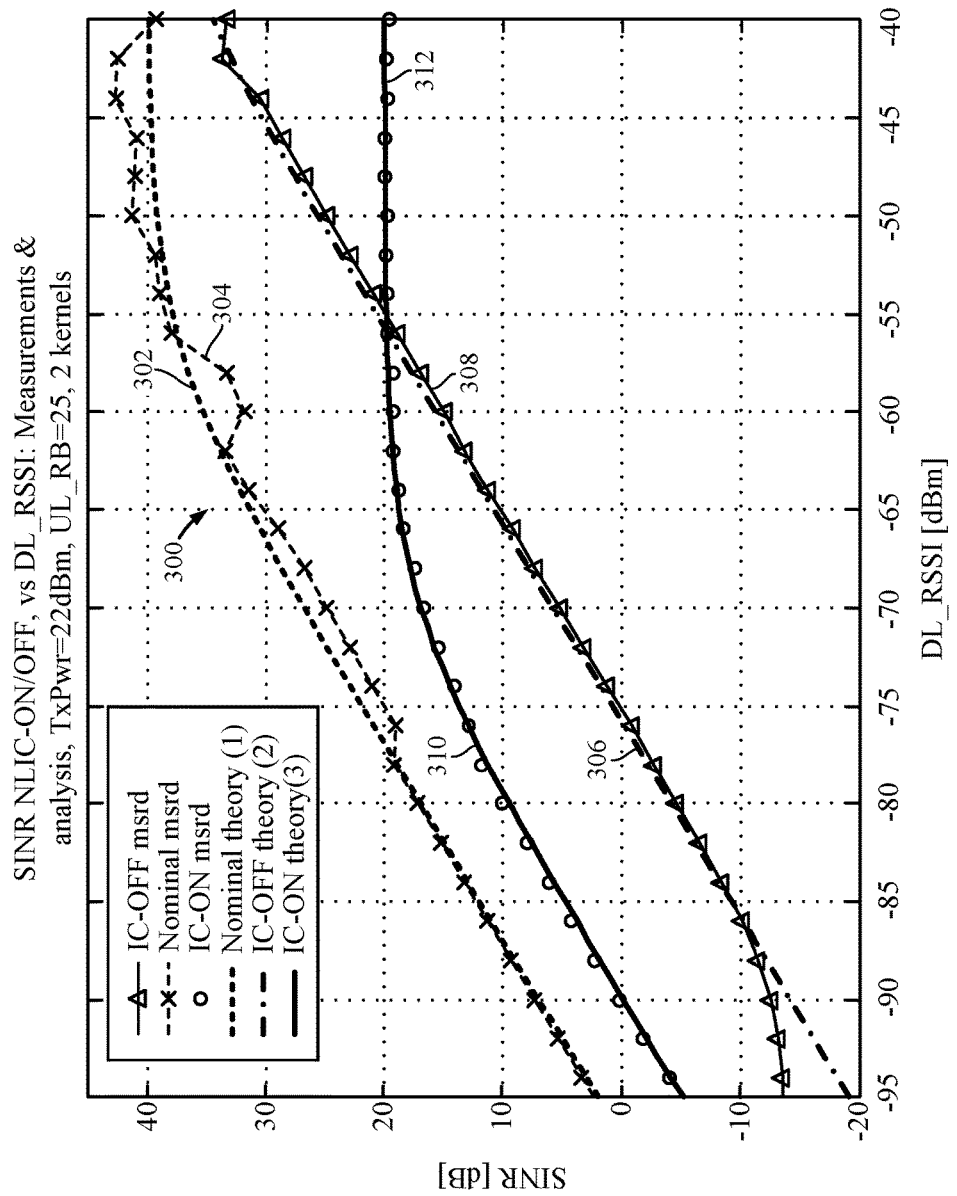
FIG. 3 illustrates relationships 300 between signal-to-noise-and-interference ratio (SINR) and downlink received signal strength indicator (RSSI) of a receive signal for various communication scenarios, respectively, in accordance with aspects of the present disclosure.

FIG. 3 illustrates relationships 300 between a signal-to-interference-plus-noise ratio (SINR) and a downlink receive signal strength indicator (RSSI) of a receive signal (e.g., a desired receive signal) for various communication scenarios, respectively, in accordance with aspects of the present disclosure. It is noted that the communication scenarios represented in FIG. 3 are examples, and the present disclosure is applicable to other communication scenarios not represented in this figure. The communication scenarios include one or more communications scenarios in which a UE 115 experiences self-jamming interference (e.g., second harmonic (H2) interference) while transmitting and receiving on LTE Bands B8 and B3, respectively, using a transmit power of 22 dBm and an allocation of 25 uplink (UL) resource blocks (RBs) for a transmission from the UE 115 and using 2 kernels or polynomials for interference cancellation (IC). Curves 302 and 304 represent respective theoretical (e.g., Nominal theory (1)) and measured (e.g., Nominal msrd) relationships between SINR and DL RSSI for an interference-free (e.g., self-jamming interference-free) or a near-interference-free communication scenario, for example, when the UE does not experience self-jamming. The theoretical relationship is based on the following formula:

$$SNR_{Nominal} = \frac{SNR}{1 + \frac{SNR}{SNR_{Max}}} \quad (1)$$

where $SNR_{Max}$ represents a maximum signal-to-noise ratio.

Curves 306 and 308 represent respective theoretical (e.g., IC-OFF theory (2)) and measured (e.g., IC-OFF msrd) relationships between SINR and DL RSSI for communications scenarios in which a UE experiences self-jamming interference (e.g., H2 interference) while transmitting and receiving on LTE Bands B8 and B3, respectively, using a transmit power of 22 dBm and an allocation of 25 UL RBs for a transmission from the UE but does not employ interference cancellation, such as non-linear interference cancellation (NLIC). The theoretical relationship is based on the following formula:

$$SINR_{IC-OFF} = \frac{SNR}{1 + INR + \frac{SNR}{SNR_{Max}}} \quad (2)$$

where $SNR_{Max}$ represents a maximum signal-to-noise ratio and INR represents an interference-to-noise ratio. Curves 310 and 312 represent respective theoretical (e.g., IC-ON theory (3)) and measured (e.g., IC-ON msrd) relationships between SINR and DL RSSI for communications scenarios in which a UE experiences self-jamming interference (e.g., H2 interference) while transmitting and receiving on LTE Bands B8 and B3, respectively, using a transmit power of 22 dBm and an allocation of 25 UL RBs for a transmission from the UE and does employ interference cancellation. The theoretical relationship is based on the following formula:

$$SINR_{IC-ON} = \frac{SNR}{1 + \frac{INR}{\eta} + \frac{SNR}{PG'}} \quad (3)$$

where η=15 dB, PG represents processing gain (e.g., of cancellation), and PG'=PG/DoF, where DoF represents degrees of freedom. As shown by curves 310 and 312, a ceiling effect occurs as the DL RSSI increases to around −56 dBm to −40 dBm in which the SINR is or remains around 20 dB when interference cancellation is employed. The ceiling effect may be caused by undesired projection of the receive signal adversely affecting the interference cancellation scheme (e.g., a time-domain interference cancellation algorithm that does not have the benefit of pilot and/or reference signals because the time-domain interference cancellation occurs) before a Fourier Transform such as Fast Fourier Transform (FFT). For example, as the RSSI of the DL signal desired to be received by a UE (e.g., transmitted from a serving base station) satisfies a threshold, the desired DL signal may adversely affect the coefficient(s) estimation performed for coupling channel reconstruction for the interference cancellation. For example, such undesired projection may produce a deviation in coefficient(s) estimation associated with interference cancellation resulting in ineffective and/or inaccurate filter coefficient(s) and/or possibly resulting in noise being introduced or injected by the interference cancellation scheme (e.g., into the receive signal receive path with power level proportional to Ps/PG), where Ps may represent signal power and PG may represent interference cancellation processing gain.

Stated another way, when estimating a coupling channel for jamming (e.g., self-jamming) interference cancellation, to achieve good cancellation, an interference cancellation scheme based on a signal streamed out from the aggressor transmitter requires estimation of a channel response of a coupling path between aggressor and victim. This task may be accomplished by an adaptive filter, such as a multi-taps adaptive filter (e.g., a synthesis filter), that reconstructs dispersive effects in the coupling channel. The estimation of the filter coefficients is in general derived by solving a MMSE or LS minimization problem which in turn implies estimating the 2nd order statistics cross-correlation between the observed composite signal and the filter sub-space (e.g., basis). Given that the cancellation is performed in time domain (TD), to prevent channel estimation degradation, it may not possible to utilize the pilot (e.g., CRS) tones that are available post-FFT for the 2nd order statistics estimation. The limited processing gain (PG) utilized for the sample average statistics estimation in TD results in a "noisy" filter coefficients estimation due to an undesired projection of the DL signal itself onto the filter sub-space. This effect is more pronounced at high signal over interference plus noise (S/(I+N)), where this undesired projection produces a deviation in the coefficient estimation resulting in "colored" noise being injected by the canceller scheme into the data path having a power level proportional to Ps/PG.

In contrast to curves 310 and 312, curves 306 and 308 indicate a higher SINR for the corresponding DL RSSI −56 dBm to −40 dBm without employing interference cancellation. Given such ceiling effect, some interference cancellation schemes turn off interference cancellation as RSSI of a receive signal satisfies a threshold. However, without interference cancellation, a receiver of the UE may de-sense and experience an SNR loss based on or proportional to the interference-to-noise ratio (INR). For example, for INR=10 dB, the signal-to-noise ratio (SNR) loss is approximately 10 dB. Thus, improved interference mitigation (e.g., interference cancellation) schemes are desired.

Figure 4:
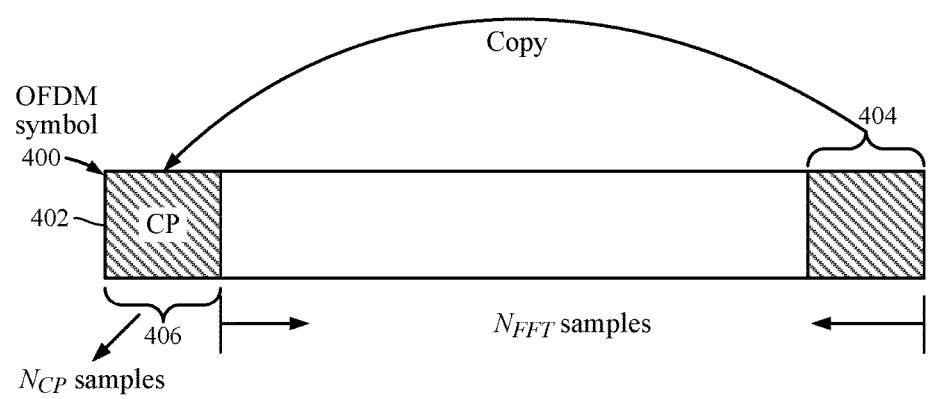
FIG. 4 shows an example of an Orthogonal Frequency Division Multiplexed (OFDM) symbol including a cyclic prefix (CP).

FIG. 4 shows an example of an Orthogonal Frequency Division Multiplexed (OFDM) symbol 400 including a cyclic prefix (CP) 402. Orthogonal frequency division multiplexing provides benefits such as spectral efficiency, robustness to fading, robustness to multipath effects, and/or bandwidth scalability. Thus, certain wireless communication systems may employ orthogonal frequency division multiplexing for communicating waveforms. In an OFDM system, a UE may receive the desired receive signal as an OFDM waveform. The desired signal includes one or more OFDM symbols 400. To maintain orthogonality in a multipath radio environment, orthogonal frequency division multiplexing systems may include a cyclic prefix (CP) 402 in an OFDM symbol 400. For example, in an orthogonal frequency division multiplexing system, a signal transmission (e.g., from a base station) may include one or more OFDM symbols 400 having cyclic prefixes 402, respectively. A CP 402 may be a replica or copy of a tail or end portion 404 of an OFDM symbol that is inserted at or fixed to the front or head portion 406 of the OFDM symbol 400. In a baseband or digital domain, an OFDM symbol 400 may be represented by a number of samples, $N_{CP}$ samples (corresponding to the CP 402) and $N_{FFT}$ samples. As described below, present methods and apparatus for improved mitigation of interference caused by a transmitter may advantageously employ the CP.

Figure 5:
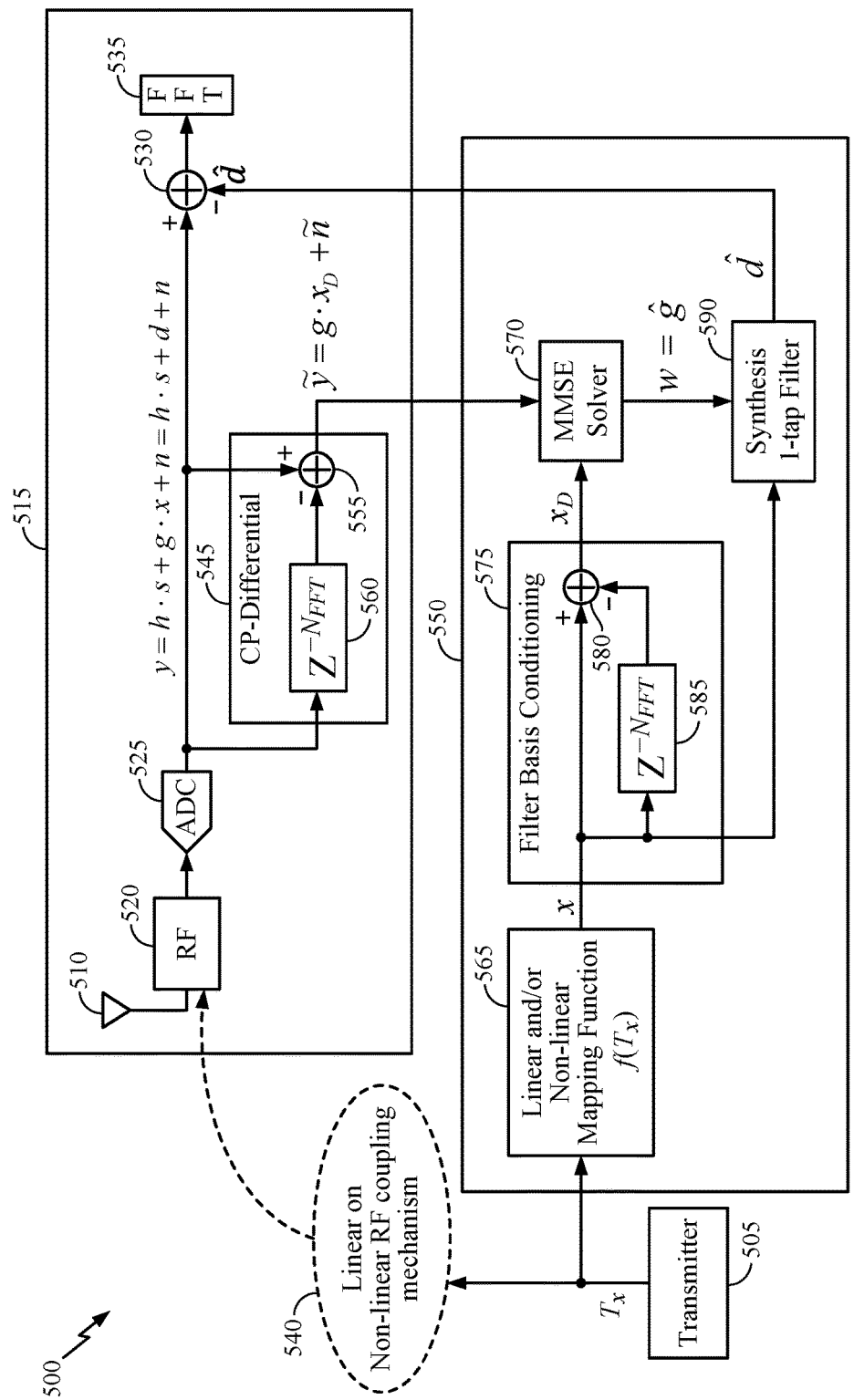
FIG. 5 illustrates an example of a wireless communication device, such as a user equipment (UE) that supports improved mitigation of interference caused by a transmitter in accordance with aspects of the present disclosure.

FIG. 5 shows a diagram of one or more components included in a wireless communication device 500, such as a user equipment (UE) for improved mitigation of interference caused by a transmitter in accordance with aspects of the present disclosure. In accordance with certain aspects of the present disclosure, the wireless communication device 500 illustrated in FIG. 5 may correspond to a base station 105, 120 and/or to a user equipment 115 from FIG. 1, for example. Wireless communication device 500 may also include one or more processors. Each of these components may be in communication with one another (e.g., via one or more buses). Further, a transmitter 505 such as a transceiver, and a receiver 515 such as a transceiver may be part of the receiver system 250 from FIG. 2. Further, a transmitter 505 such as a transceiver and a receiver 515 such as a transceiver may be part of the transmitter system 210 from FIG. 2. According to certain aspects of the present disclosure, the processor 270 and/or other processors and modules at the receiver system 250 may perform or direct operations 600 in FIG. 6 and/or other processes for the techniques described herein for wireless communication device 500. According to certain aspect of the present disclosure, the processor 230, and/or other processors and modules at the transmitter system 210 may perform or direct operations 600 in FIG. 6 and/or other processes for the techniques described herein for wireless communication device 500.

The transmitter 505 may include one or more transmit chains, each transmit chain supporting transmission of an analog transmission waveform. Generation of the analog transmission waveform(s) via the first transmit chain may include for example, modulating, digital-to-analog conversion, filtering, and/or mixing of a signal. Further, such signal may be amplified and such signal may be coupled to duplexer to be coupled to associated antenna(s) 510 for transmission.

The receiver 515 may include an antenna 510, RF components 520, for example, such as a duplexer, a low-noise amplifier (LNA), a mixer, and a low-pass filter (LPF). The receiver 515 may also include, for example, an analog-to-digital converter (ADC) 525, digital LPF (DLPF), and an adder 530, which are designed to receive and condition a receiver waveform and provide digital baseband I and Q samples to a demodulator/decoder via an FFT logic 535.

Transmission of one or more waveforms from the transmitter 505 may create a coupling channel 540 between the transmitter 505 and the receiver 515. Such coupling mechanism may introduce non-linear and/or linear interference to the receiver 515. The interference coupling channel may remain the same across an OFDM symbol given the coupling channel is quasi-static and changes at a relatively low rate (e.g., due to hand movements).

For example, during amplification and/or duplexing, the transmission waveform is introduced into the receiver 515 thereby introducing an analog distortion component (e.g., a distorting signal) into the receive chain of the receiver 515. For example, transmission waveforms may intermodulate within a duplexer, PA, etc. Additionally or alternatively, harmonics of a transmission waveform, spurs, and/or power amplifier noise may be introduced into the receiver 515. Thus, the output of the duplexer may include a distortion component d and a receive waveform component s. The distortion component d may be considered distortion or otherwise an undesired signal from the perspective of receiver 515.

For example, a signal received by a receiver 515 may be modeled using the following received signal model:

$$y(i)=h \cdot s(i)+g \cdot x(i)+n(i) \quad (4)$$

where s may represent a DL modulated signal like a DL OFDM modulated signal (e.g., a signal desired to be received by wireless communication device 500, for example, transmitted by a serving base station for the wireless communication device 500), x may represent interference (e.g., including the distortion), n may represent noise like additive white Gaussian noise (AWGN), h may represent a propagation channel of the desired signal, and g may represent an interference coupling channel.

According to some schemes, to cancel a distortion component d (e.g., g·x), a wireless communication device may include an interference cancellation component (e.g., an interference mitigator) to cancel interference of a received signal. Such interference cancellation component may generate an estimated distortion component $\hat{d}$ by employing the signal(s) transmitted from a transmitter and by employing a received signal y(i) model. The estimated distortion component $\hat{d}$ may be based on estimated filter coefficients that employ the model of the received signal model and an interference model based on the signal(s) transmitted from a transmitter. For example, if a wireless communication device is configured to transmit on LTE band B17 for uplink transmission (e.g., using center frequency of 714 MHz and to transmit on LTE band B4 for downlink transmission (e.g., using center frequency 2142 MHz), the interference cancellation component is configured to generate a third order harmonic interference model because a third order harmonic of the baseband transmission signal interferes with DL receive signal. The generated interference model may be represented as follows:

$$x(i)=f(T_x) \quad (5)$$

where $T_x$ represents the transmitted signal(s) (e.g., transmitted by the wireless communication device) used for interference synthesis in reconstruction path (e.g., $T_x$ may be obtained from sample capture of the transmitter signal or via a sensing path), $f(\cdot)$ represents a linear/nonlinear function model of interference generation (e.g., specific coupling mechanism). In this example, $f(\cdot)$ is a non-linear third harmonic interference model (HD3) which, for example, may be represented as the sum of a third and fifth order harmonic as follows:

$$f(T_x)=\alpha_1 \cdot T_x^3 + \alpha_2 \cdot T_x^3|T_x|^2 \quad (6)$$

Given $T_x$ and y, the interference cancellation component estimates a set of weights w that represent the cascaded effects of linear/nonlinear function $f(\cdot)$ coefficients and the interference coupling channel g. For HD3 example, the reconstructed distortion $\hat{d}$ is given by:

$$\hat{d}(i) = \hat{g} \cdot x(i) = \sum_{l=0}^{L-1} w_1(l)T_x^3(i-l) + w_2(l)T_x^3(i-l)|T_x(i-l)|^2 \quad (7)$$

where l may refer to filter (e.g., finite-length impulse response filter) coefficient index which may go from 1 to L, where L may be the total number of coefficients in the filter.

However, in such schemes, the filter coefficients may be inaccurate and/or noisy when a desired receive signal RSSI satisfies a threshold because such interference cancellation scheme employs the received signal y (e.g., the composite signal). As described above, the DL signal s may adversely affect the filter coefficient estimation as part of coupling channel g reconstruction for the interference cancellation, for example, when a desired signal RSSI satisfies (e.g., meets or exceeds) a threshold.

Thus, in contrast to such schemes, in aspects, to cancel the distortion component d (e.g., g·x) in adder 530, the wireless communication device 500 may include a composite signal modifier 545 to modify one or more time domain samples of the composite signal in the receive chain of the receiver 515. The composite signal modifier 545 may generate a modified received signal y corresponding to one or more received signal time-domain samples based on one or more other received signal time-domain samples. The modified received signal may represent a received signal observation that is free from the desired signal. The modified received signal y may be represented as follows:

$$\tilde{y}=g \cdot x_D + \tilde{n} \quad (8)$$

For example, the composite signal modifier 545 may include logic 555 to generate a modified received signal corresponding to one or more received signal time-domain samples based on one or more other received (e.g., subsequently-received) signal time-domain samples, for example, output from delay logic 560 (e.g., logic to delay samples by $N_{FFT}$ samples, where $N_{FFT}$ may be an integer). As described above, a CP 402 may be a replica or copy of a tail or end portion 404 of an OFDM symbol that is inserted at or fixed to the front or head portion 406 of the OFDM symbol 400. In aspects, the composite signal modifier 545 may exploit such CP duplication property of one or more OFDM symbols to remove the desired signal from the received signal (e.g., the composite signal) in the time-domain. For example, a modified received signal for one or more time-domain samples of the tail or end portion 404 of the OFDM symbol 400 may be generated based on corresponding one or more received signal time-domain samples of the CP portions 406 of the OFDM symbol 400, or vice versa. For example, in aspects, the composite signal modifier 545 may subtract one or more portions of the CP portion of the symbol from the corresponding portion the tail or end portion 404 (e.g., represented by the last $N_{CP}$ samples, where $N_{CP}$ may be an integer). In this manner, a sample of the CP portion may be subtracted from the corresponding sample of the tail or end portion 404 to yield a differential sample (e.g., a CP-differential sample). The result of this operation produces a vector of samples (e.g., differential samples) including only interference and noise over a $T_{CP}$ interval (e.g., at an end of an OFDM symbol) thus enabling for accurate estimation of filter coefficients, second order statistics computation like covariance matrix computation, and/or cross-correlation computation. $T_{CP}$ interval may correspond to a period of time of the CP portion 406. Further, because the composite signal modifier 545 may operate on a portion (e.g., rather than the whole) of the tail or end portion 404 of an OFDM symbol 400 based on a corresponding portion of the CP portion 406 of the OFDM symbol 400, the present methods and apparatus provide a robust solution for a multipath radio environment and/or provide a robust solution despite inter-symbol interference generated by the dispersive nature of the desired channel response contaminating a portion of the CP. For example, the interference second order statistics estimation may be based on a remaining (e.g., uncontaminated) portion of the CP (e.g., CP portion 406). Even if such remaining portion includes a small number of samples for the estimation, a large number of correlation can be averaged due to quasi-static nature of interference coupling mechanism. Alternatively, in aspects the composite signal modifier 545 may subtract a corresponding tail or end portion 404 (e.g., represented by the last $N_{CP}$ samples, where $N_{CP}$ may be an integer) of the symbol from the one or more portions of the CP portion of the symbol (e.g., $s(i)-s(i+N_{FFT})$).

For example, if the composite signal modifier 545 operates on OFDM symbol 400 to subtract samples of the CP portion 406 of the OFDM symbol 400 from the corresponding $N_{CP}$ samples in the tail or end portion 404 of the OFDM symbol 400 (e.g., $s(i+N_{FFT})-s(i)$) to obtain the signal-free (e.g., desired-signal-free) observation samples, the modified received signal model may be represented as follows:

$$\tilde{y}(i)=y(i+N_{FFT})-y(i)=h\cdot[s(i+N_{FFT})-s(i)]+g\cdot[x(i+N_{FFT})-x(i)]+[n(i+N_{FFT})-n(i)]=g\cdot x_D(i)+\tilde{n}(i), \text{ for } i=1,2,\ldots,N_{CP} \quad (9)$$

where $x_D$ represents a modified modeled interference as described below.

The composite signal modifier 545 may be coupled to and provide such modified received signal $\tilde{y}$ to an interference mitigator 550 to mitigate, cancel and/or suppress interference of the received signal based on such modified received signal model. Because the interference mitigator 550 employs the modified received signal $\tilde{y}$ free of the desired receive signal rather than the received signal y (e.g., composite signal), the interference cancellation scheme may reduce and/or avoid the undesired projection issues described above. Since the interference mitigator 550 employs a modified version of the received signal, the interference mitigator 550 performs a same, similar or corresponding operation that is performed by the composite signal modifier 545 on the reconstructed or modeled interference (as represented by a filter basis conditioner 575). The interference mitigator 550 may determine adaptive filter coefficients based on the modified received signal and a filter basis conditioned using a same operation (e.g., an operation yielding differential samples) employed to modify the received signal. More specifically, the interference mitigator 550 may include a linear and/or non-linear mapping function component 565. In aspects, the linear and/or non-linear mapping function component 565 may be coupled to the transmitter 505 and digital baseband I and Q samples of one or more signals transmit from a transmit chain are provided to the non-linear mapping function component 565. The linear and/or non-linear mapping function component 565 may generate one or more interference models based on the provided digital baseband I and Q samples of one or more signals transmit from a transmit chain to reconstruct the interference. In some examples, the linear and/or non-linear mapping function component 565 may generate one or more polynomials to generate one or more interference models. For example, if wireless communication device 500 is configured to transmit on LTE band B17 for uplink transmission (e.g., using center frequency of 714 MHz and to transmit on LTE band B4 for downlink transmission (e.g., using center frequency 2142 MHz), the interference mitigator 550 may be configured to generate a third order harmonic interference model because a third order harmonic of the baseband transmission signal interferes with DL receive signal. The generated interference model may be represented as follows:

$$x(i)=f(T_x) \quad (10)$$

where $T_x$ represents the transmitted signal used for interference synthesis in reconstruction path (e.g., $T_x$ may be obtained from sample capture of transmitter signal or via a sensing path), $f(\bullet)$ represents a linear/nonlinear function model of interference generation (e.g., specific coupling mechanism), which for this example is a non-linear third harmonic interference model. In this example, $f(\bullet)$ is a non-linear third harmonic interference model (HD3) represented as the sum of a third and fifth order harmonics as follows:

$$x_1(i)=T_x^3(i) \quad (11)$$

$$x_2(i)=T_x^3(i)|T_x(i)|^2 \quad (12)$$

However, rather than directly providing $x_1(i)$ and $x_2(i)$ to a filter coefficient(s) or weight(s) estimator 570 (e.g., an MMSE solver, LS minimization solver, or the like), the interference mitigator 550 includes a filter basis conditioner 575 coupled between the non-linear mapping function component 565 and the filter coefficient(s) or weight(s) estimator 570. The filter basis conditioner 575 may modify the generated interference model signals x in the same, similar, or corresponding manner as the received signal is modified. For example, the filter basis conditioner 575 may include logic 580 to generate a modified modeled interference $x_D$ corresponding to one or more received modeled interference signal time-domain samples x based on one or more other received (e.g., subsequently-received) modeled interference time-domain samples, for example, output by delay logic 585 (e.g., logic to delay samples by $N_{FFT}$ samples, where $N_{FFT}$ may be an integer). In this manner, differential modeled interference samples may be created based on the modeled interference for the transmitted signal. For example, the differential samples for the third and fifth harmonics may be generated as follows:

$$x_{1,D}(i)=x_1(i+N_{FFT})-x_1(i) \text{ for } i=1,2,\ldots,N_{CP} \quad (13)$$

$$x_{2,D}(i)=x_2(i+N_{FFT})-x_2(i) \text{ for } i=1,2,\ldots,N_{CP} \quad (14)$$

In this manner, a conditioning may be applied to the adaptive filter basis corresponding to and/or to ensure consistency with the modified received signal observation samples ỹ(i) for correct channel tap(s) estimation. Thus, the adaptive filter basis may be appropriately conditioned. The filter basis conditioner 575 provides the conditioned adaptive filter basis or differential modeled interference samples $x_D$ to the filter coefficient(s) or weight(s) estimator 570 based on which the filter coefficient(s) or weight(s) estimator 570 may estimate adaptive filter coefficients or weights. For example, the filter coefficient(s) or weight(s) estimator 570 may estimate second order statistics (e.g., a cross-correlation between the observed composite signal and a filter sub-space (basis). In aspects, the filter coefficient(s) or weight(s) estimator 570 may determine a covariance matrix and/or the cross-correlation. However, rather than basing such computations on the modeled interference x, the filter coefficient(s) or weight(s) estimator 570 will base the computation of the covariance matrix and the cross-correlation on the differential modeled interference $x_D$ as follows, respectively:

$$R_{X_D X_D} = E[X_D \cdot X_D^H] \quad (15)$$

$$r_{X_D \tilde{y}} = E[X_D \cdot \tilde{y}^H] \quad (16)$$

Based on such computations the filter coefficient(s) or weight(s) estimator 570 may determine estimate a set of weights w that represent the cascaded effects of linear/nonlinear function $f(\cdot)$ coefficients and the interference coupling channel g to estimate a reconstruction of the interference coupling channel ĝ as follows:

$$w = R_{X_D}^{-1} \cdot r_{X_D \tilde{y}} \quad (17)$$

The filter weights w determined by the filter coefficient(s) or weight(s) estimator 570 may be more accurate and/or suffer less from the projection issues described above even if the desired signal RRSI satisfies a threshold because the filter coefficient(s) or weight(s) estimator 570 processes a modified received signal ŷ (e.g., a differential samples having the desired signal reduced and/or removed). The interference mitigator 550 may include an adaptive filter 590 such as a synthesis 1-tap filter coupled to the filter coefficient(s) or weight(s) estimator 570. The adaptive filter 590 may generate an estimated or reconstructed distortion d̂. For example, the adaptive filter 590 may receive the generated interference model x and the filter coefficient(s) or weight(s) w and generate d̂ based thereon. The adaptive filter 590 may be coupled to and provide the reconstructed distortion d̂ to the adder 530. The reconstructed distortion signal d̂ may then be canceled from the receiver 515 in adder 530 (e.g., introduced into the adder 530 as a negative signal) to provide the resulting signal to the FFT logic 535. Although, the wireless communication device 500 is described in the context of a single antenna and/or single transmission path for ease of illustration, the solution also applies for wireless communication devices employing a larger number of antennas and/or transmission communications paths and/or a multi-taps adaptive filter.

Figure 6:
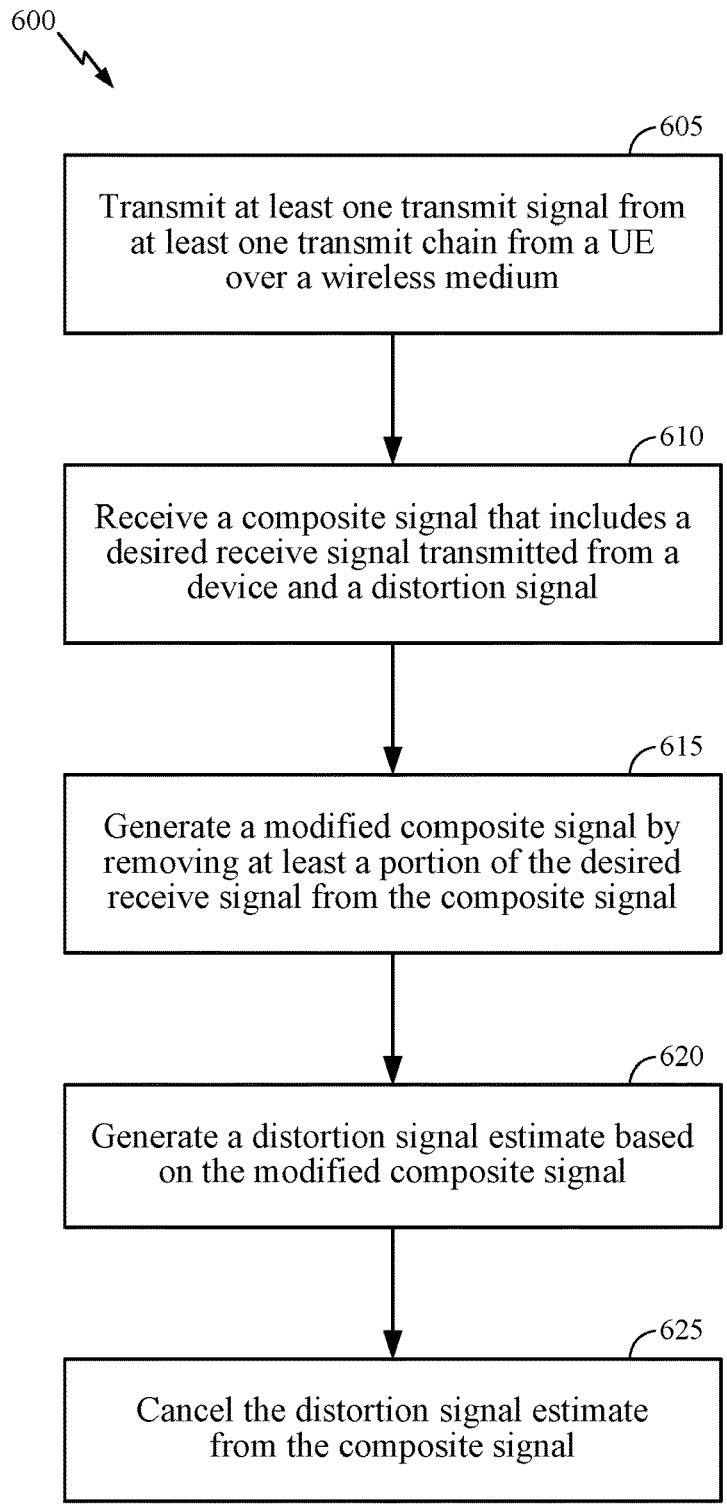
FIG. 6 illustrates example operations for improved mitigation of interference caused by a transmitter in accordance with aspects of the present disclosure.

FIG. 6 illustrates example operations 600 for improved mitigation of interference caused by a transmitter in accordance with aspects of the present disclosure. The functions of operations 600 may be implemented by any of the UEs 115, base stations 105 transmitter system 210, receiver system 250 and wireless communication device 500, 700, 800 described herein.

At block 605, at least one transmit signal is transmitted, for example, from at least one transmit chain from a UE over a wireless medium. Alternatively or additionally, in aspects, the UE may be proximate another UE transmitting at least one transmit signal from its at least one transmit chain. In aspects, transmitting at least one transmit signal from at least one transmit chain from a UE over a wireless medium includes transmitting a first signal from a first transmit chain from the UE and transmitting a second signal from a second transmit chain from the UE. At block 610, a composite signal that includes a desired receive signal transmitted from a device and a distortion signal are received by the UE. In aspects, the desired receive signal may have been transmitted from the intended transmitter, such as a base station (e.g., a serving base station).

At block 615, a modified composite signal may be generated by removing at least a portion of the desired receive signal from the composite signal. In aspects, the least a portion of the desired receive signal corresponds to one or more portions of a cyclic prefix (e.g., of a symbol such as an OFDM symbol). In aspects, the least a portion of the desired receive signal is one or more end portions of a symbol in the desired receive signal. In aspects, the desired receive signal includes an OFDM waveform. The present operations 600 may exploit a property of receiving a desired receive signal being modulated with OFDM and including a cyclic prefix (CP), which is copied from the tail of the OFDM symbol and pasted to the front of the OFDM symbol.

At block 620, a distortion signal estimate may be generated based on the modified composite signal. In aspects, generating the distortion signal estimate based on the modified composite signal includes determining adaptive filter coefficients based on the modified composite signal. In such aspects, generating the distortion signal estimate includes generating the distortion signal estimate based on the adaptive filter coefficients. In aspects, generating the distortion signal estimate based on the modified composite signal includes determining adaptive filter coefficients further based on an adaptive filter basis conditioned based on a same operation employed to create the modified composite signal from the composite signal. In such aspects, the adaptive filter basis is based on one or more samples of the at least one transmit signal (e.g., appropriately conditioned, for example as described above). In aspects, the adaptive filter coefficients represent at least one of effects of linear distortion, effects of non-linear distortion or an interference coupling channel At block 625, the distortion signal estimate may be canceled from the composite signal. In aspects, generating the modified composite signal of block 615, generating the distortion signal estimate of block 620, and canceling the distortion signal estimate of block 625 may be performed in response to an RSSI of the composite signal or receive signal satisfying a threshold. For example, the operations of blocks 615, 620 and 625 may be performed if the RSSI of the composite signal or receive signal meets or exceeds a threshold.

Although FIG. 6 shows example blocks of process 600, in some aspects, process 600 may include additional blocks, fewer blocks, different blocks, or differently arranged blocks than those depicted in FIG. 600. Additionally, or alternatively, two or more of the blocks of process 600 may be performed in parallel.

Figure 7:
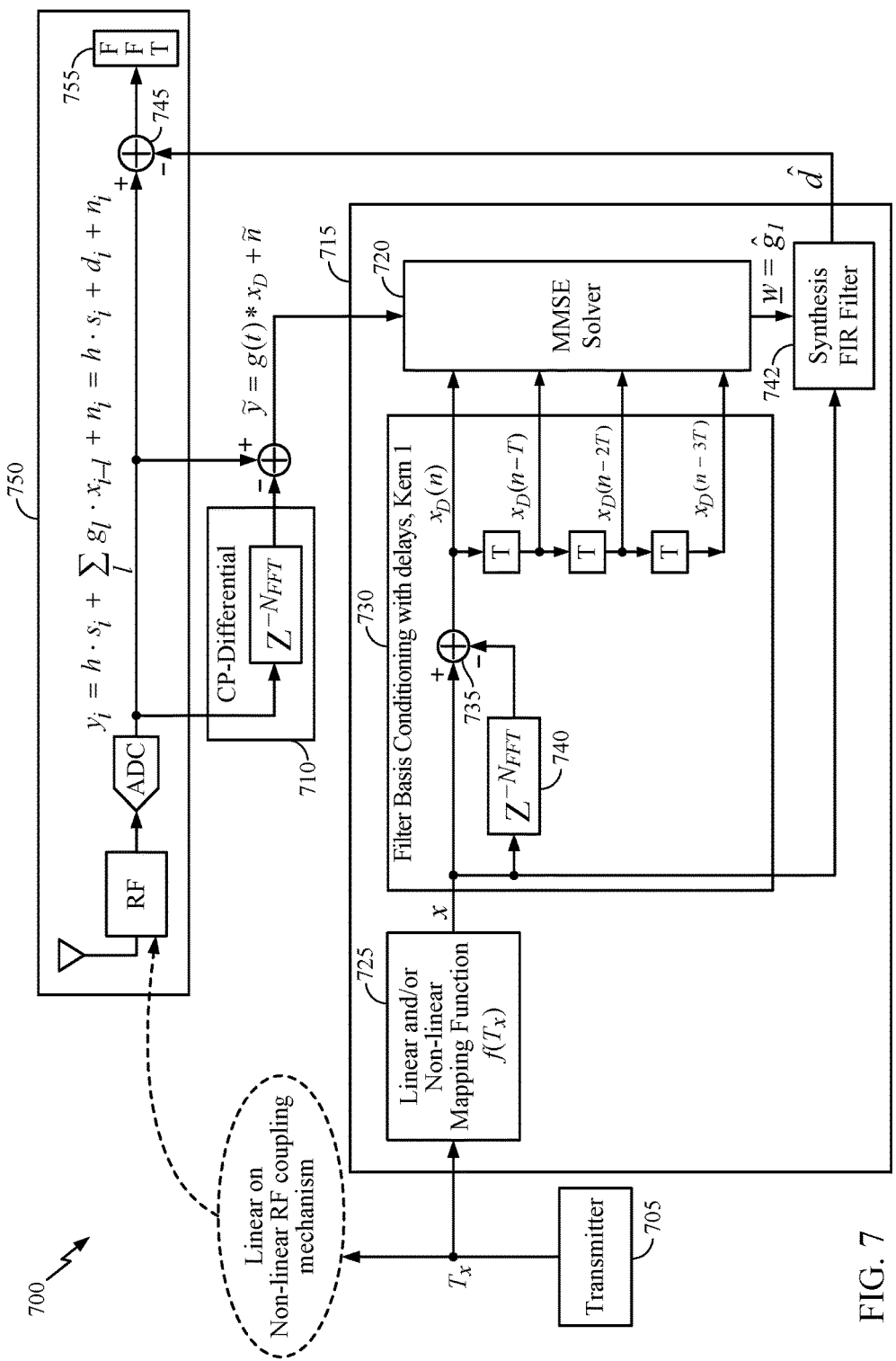
FIG. 7 illustrates another example of a wireless communication device, such as a user equipment (UE) that supports improved mitigation of interference caused by a transmitter in accordance with aspects of the present disclosure.

FIG. 7 illustrates another example of a wireless communication device 700, such as a user equipment (UE), that supports improved mitigation of interference caused by a transmitter 705 in accordance with aspects of the present disclosure. The operation of wireless communication device 700 is similar to wireless communication device 500. The wireless communication device 700 may transmit at least one signal that may couple to the victim receiver via a plurality of paths (e.g., while receiving a desired receive signal). Because the transmitter 705 manifests itself at the victim receiver via a plurality of signals, the interference and interference coupling channel of the received signal may be represented as follows:

$$g \cdot x(i) = \sum_{l} g_l \cdot x_{i-l} \qquad (18)$$

where l may refer to filter (e.g., finite-length impulse response filter) coefficient index. The modified composite signal may be represented as follows:

$$\tilde{y} = g(t) * x_D + \tilde{n} \qquad (19)$$

where * denotes convolution.

As with the wireless communication device 500, the composite signal modifier 710 of wireless communication device 700 may be coupled to and provide such modified received signal to an interference mitigator 715 to mitigate, cancel and/or suppress interference of the received signal based on such modified received signal model. For example, the composite signal modifier 710 may provide the modified composite signal ĵ7 to a filter coefficient(s) or weight(s) estimator 720 (e.g., an MMSE solver, LS minimization solver, or the like). Since the interference mitigator 715 employs a modified version of the received signal, the interference mitigator 715 performs a same, similar or corresponding operation that is performed by the composite signal modifier 710 on the reconstructed or modeled interference. The interference mitigator 715 may determine adaptive filter coefficients based on the modified received signal and a filter basis conditioned using a same, similar or corresponding operation employed to modify the received signal. More specifically, the interference mitigator 715 may include linear and/or non-linear mapping function component 725. In aspects, the linear and/or non-linear mapping function component 725 may be coupled to the transmitter 705 and digital baseband I and Q samples of the one or more signals transmit from respective transmit chains are provided to the linear and/or non-linear mapping function component 725. The linear and/or non-linear mapping function component 725 may generate one or more interference models based on the provided digital baseband I and Q samples of one or more signals transmit respective transmit chains to reconstruct the interference. In some examples, the linear and/or non-linear mapping function component 725 may generate one or more polynomials to generate one or more interference models. The generated interference model may be represented as follows:

$$x(i) = f(T_x) \qquad (20)$$

where $T_x$ represents the transmitted signals used for interference synthesis in reconstruction path (e.g., $T_x$ may be obtained from sample capture of transmitter signal or via a sensing path), $f(\cdot)$ represents a linear/nonlinear function model of interference generation (e.g., specific coupling mechanism), which for this example may include or be based on an intermodulation distortion model.

However, rather than directly providing the modeled interference x to the filter coefficient(s) or weight(s) estimator 720, the interference mitigator 715 includes a filter basis conditioner 730 coupled between the linear and/or non-linear mapping function component 725 and the filter coefficient(s) or weight(s) estimator 720. The filter basis conditioner 730 may modify the generated interference signals model in the same, similar, or corresponding manner as the received signal is modified. For example, the filter basis conditioner 730 may include logic 735 to generate a modified modeled interference $x_D$ corresponding to one or more received modeled interference signal time-domain samples x based on one or more other received (e.g., subsequently-received) modeled interference time-domain samples, for example, output by delay logic 740 (e.g., logic to delay samples by $N_{FFT}$ samples, where $N_{FFT}$ may be an integer). In this manner, differential modeled interference samples may be created based on the modeled interference for the transmitted signal. In this manner, a conditioning may be applied to the adaptive filter basis corresponding to and/or to ensure consistency with the modified received signal observation samples ỹ.

Further, the interference mitigator 715 may include an adaptive filter 742 which may be a multi-taps filter such as a finite-length impulse response (FIR) filter coupled to the filter coefficient(s) or weight(s) estimator 720. The adaptive filter 742 may introduce a plurality of cascaded "unit delays" to the modeled interference to replicate the multi-paths coupling mechanism. The adaptive filter 742 may generate an estimated or reconstructed distortion d̂. For example, the adaptive filter 742 may receive the generated interference model x and the filter coefficients or weights w, which are associated with a reconstruction of the interference coupling channel $\hat{g}_l$ (e.g., a multi-path interference coupling channel), and generate d̂ based thereon. The adaptive filter 742 may be coupled to and provide the reconstructed distortion d̂ to the adder 745. The reconstructed distortion signal d̂ may then be canceled from a receiver 750 by adder 745 (e.g., introduced into the adder 745 as a negative signal) to provide the resulting signal to FFT logic 755. In aspects, because the adaptive filter 742 may be a multi-taps filter and because the filter coefficient(s) or weight(s) estimator 720 associated therewith or coupled thereto receives the modified composite signal ỹ, for correct channel taps estimation, the filter basis conditioner 730 may generate differential modeled interference $x_D$ (n) having one or more corresponding "unit delays" (e.g., $x_D(n-T)$, $x_D(n-2T)$, and $x_D(n-3T)$) based on the differential modeled interference samples $x_D$. The filter basis conditioner 730 may provide such conditioned adaptive filter basis to the filter coefficient(s) or weight(s) estimator 720 based on which the filter coefficient(s) or weight(s) estimator 720 may estimate adaptive filter coefficients or weights.

For example, the filter coefficient(s) or weight(s) estimator 720 may estimate second order statistics (e.g., a cross-correlation between the observed composite signal and a filter sub-space (basis). In aspects, the filter coefficient(s) or weight(s) estimator 720 may determine a covariance matrix and/or the cross-correlation. However, rather than basing such computations on the modeled interference x the filter coefficient(s) or weight(s) estimator 720 will base the computation of the covariance matrix and the cross-correlation on the differential modeled interference $x_D$ as follows, respectively:

$$R_{X_D X_D} = E[X_D \cdot X_D^H] \qquad (21)$$

$$r_{X_D \tilde{y}} = E[X_D \cdot \tilde{y}^H] \qquad (22)$$

Based on such computations the filter coefficient(s) or weight(s) estimator 720 may determine estimate a set of weights w that represent the cascaded effects of linear/nonlinear function $f(\cdot)$ coefficients and the interference coupling channel g to estimate a reconstruction of the interference coupling channel $\hat{g}_l$ as follows:

$$w = R_{X_D}^{-1} \cdot r_{X_D \tilde{y}} \qquad (23)$$

The filter coefficient weights w determined by the filter coefficient(s) or weight(s) estimator 720 may be more accurate and/or suffer less from the projection issues described above even if the desired signal RRSI satisfies a threshold because the filter coefficient(s) or weight(s) estimator 720 processes a modified received signal (e.g., a differential samples having the desired signal reduced and/or removed). In this manner, in aspects, the present methods and apparatus provide improved interference cancellation performance for OFDM systems at high signal (S) to interference (I) plus noise (N) ratio (e.g., S/(I+N)).

Figure 8:
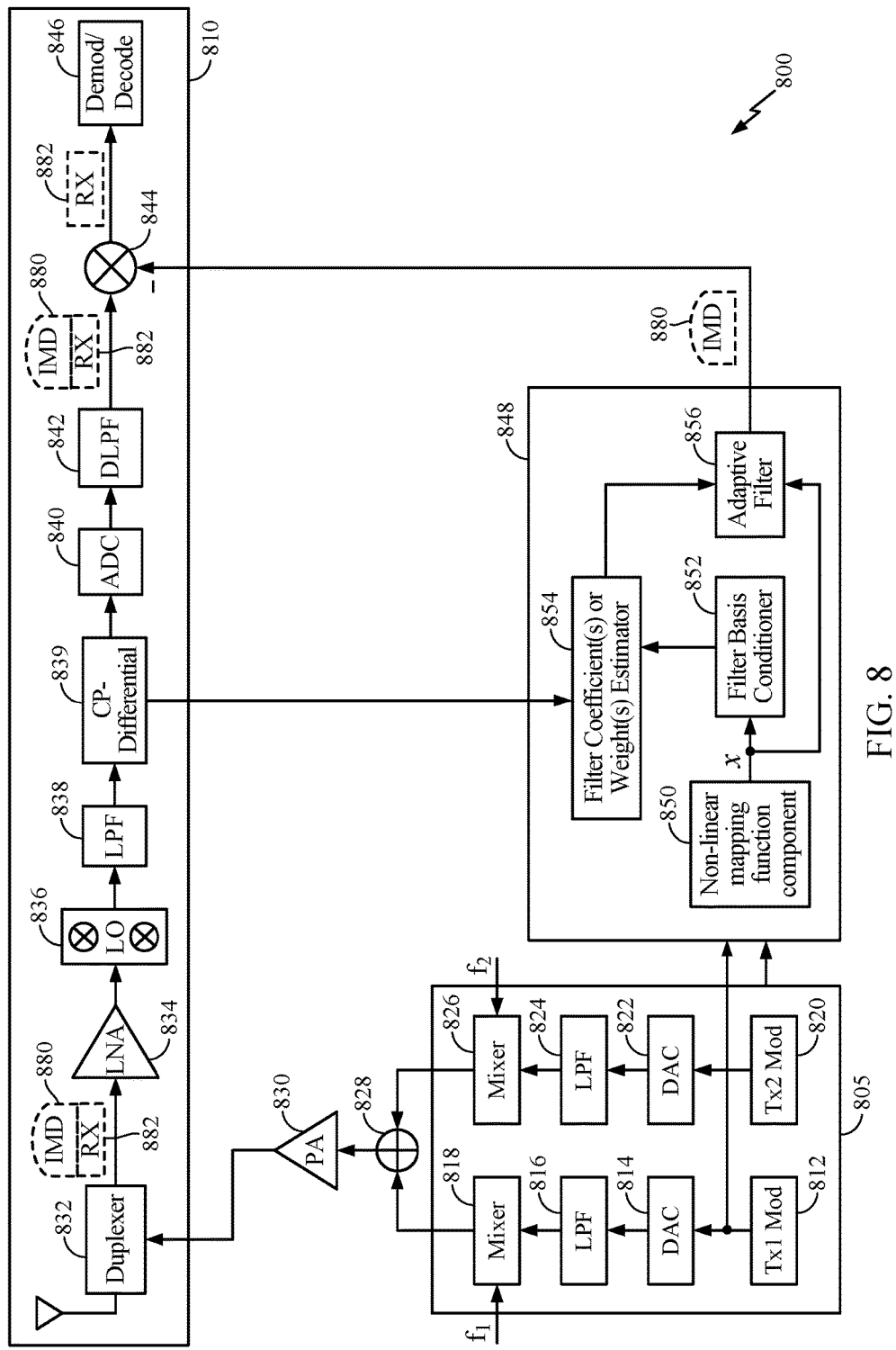
FIG. 8 shows a diagram of one or more components included in a wireless communication device, such as a user equipment (UE) for improved mitigation of interference caused by a transmitter in accordance with aspects of the present disclosure.

FIG. 8 illustrates another example of a wireless communication device 800, such as a user equipment (UE) that supports improved mitigation of interference caused by a transmitter including transmitting component and receiving component details in accordance with aspects of the present disclosure. Wireless communication device 800 may support operation on multiple cells or carriers, a feature which may be referred to as carrier aggregation (CA) or multi-carrier operation. Wireless communication device 800 may include a transmitter 805 such as a transceiver and a receiver 810 such as a transceiver and may be part of the receiver system 250 from FIG. 2 The transmitter 805 may include two transmit chains, which each transmit chain supporting transmission of an analog transmission waveform (e.g., as part of CA operation). The first transmit chain may include Tx1 modulator 812, digital-to-analog converter (DAC) 814, low-pass filter (LPF) 816, and mixer 818. Tx1 modulator 812 may provide digital I and Q baseband samples, which are used to generate an RF output signal (e.g., a first analog transmission waveform) from the first transmit chain. More particularly, the I and Q baseband samples are converted to analog signals by DAC 814. These analog signals are passed through LPF 816 and mixed with a transmit local oscillator signal $f_1$ by mixer 818. The resultant signal is output to a combiner 828.

Similarly, the second transmit chain may include Tx2 modulator 820, DAC 822, LPF 824, and mixer 826. Tx2 modulator 820 may provide digital I and Q baseband samples, which are used to generate an RF output signal (e.g., a second analog transmission waveform) from the second transmit chain. More particularly, the I and Q baseband samples are converted to analog signals by DAC 822. These analog signals are passed through LPF 824 and mixed with a transmit local oscillator signal $f_2$ by mixer 826. The resultant signal is output to the combiner 828 where it is added (e.g., combined) with the output from the first transmit chain.

The resultant signal from combiner 828 is coupled to power amplifier (PA) 830 for amplification. The amplified signal is coupled to duplexer 832 to be coupled to associated antenna(s) for transmission.

Receive component 810 may include the duplexer 832, low-noise amplifier (LNA) 834, mixer 836, LPF 838, composite signal modifier 839, ADC 840, digital LPF (DLPF) 842, and adder 844, which are designed to receive and condition a receiver waveform and provide digital baseband I and Q samples to demodulator/decoder 846. In aspects, the composite signal modifier 839 may include or be composite signal modifier 545 or 710. The first and second analog transmission waveforms are introduced into the receive component 810 thereby introducing an analog IMD component (e.g., a distorting signal) into the receive chain of the receive component 810. For example, the first and second analog transmission waveforms may intermodulate within duplexer 832, PA 830, etc. Thus, the output of the duplexer 832 may include an IMD component 880 and a receive waveform component 882. The IMD component 880 may be considered distortion or otherwise an undesired signal from the perspective of receive component 810.

To cancel the IMD component 880 in adder 844, the wireless communication device 800 may include an interference mitigator 848, for example including a non-linear mapping function component 850, coupled to a filter basis conditioner 852 coupled to a filter coefficient(s) or weight(s) estimator 854. The filter coefficient(s) or weight(s) estimator 854 may be coupled to an adaptive filter 856. In aspects, the interference mitigator 848 may include or be interference mitigator 550 or 715. In aspects, the non-linear mapping function component 850 may include or be linear and/or non-linear mapping function component 565 or 725. In aspects, the filter basis conditioner 852 may include or be filter basis conditioner 575 or 730. In aspects, the filter coefficient(s) or weight(s) estimator 854 may include or be filter coefficient(s) or weight(s) estimator 570 or 720. In aspects, the adaptive filter 856 may include or be adaptive filter 590 or 742. The reconstructed distortion signal (e.g., IMD 880) may then be canceled from the receive waveform component 882 by adder 844 (e.g., introduced into the adder 844 as a negative signal) to provide the receive waveform component 882 (e.g., the desired or wanted receive waveform) to the demodulator/decoder 846.

Figure 9:
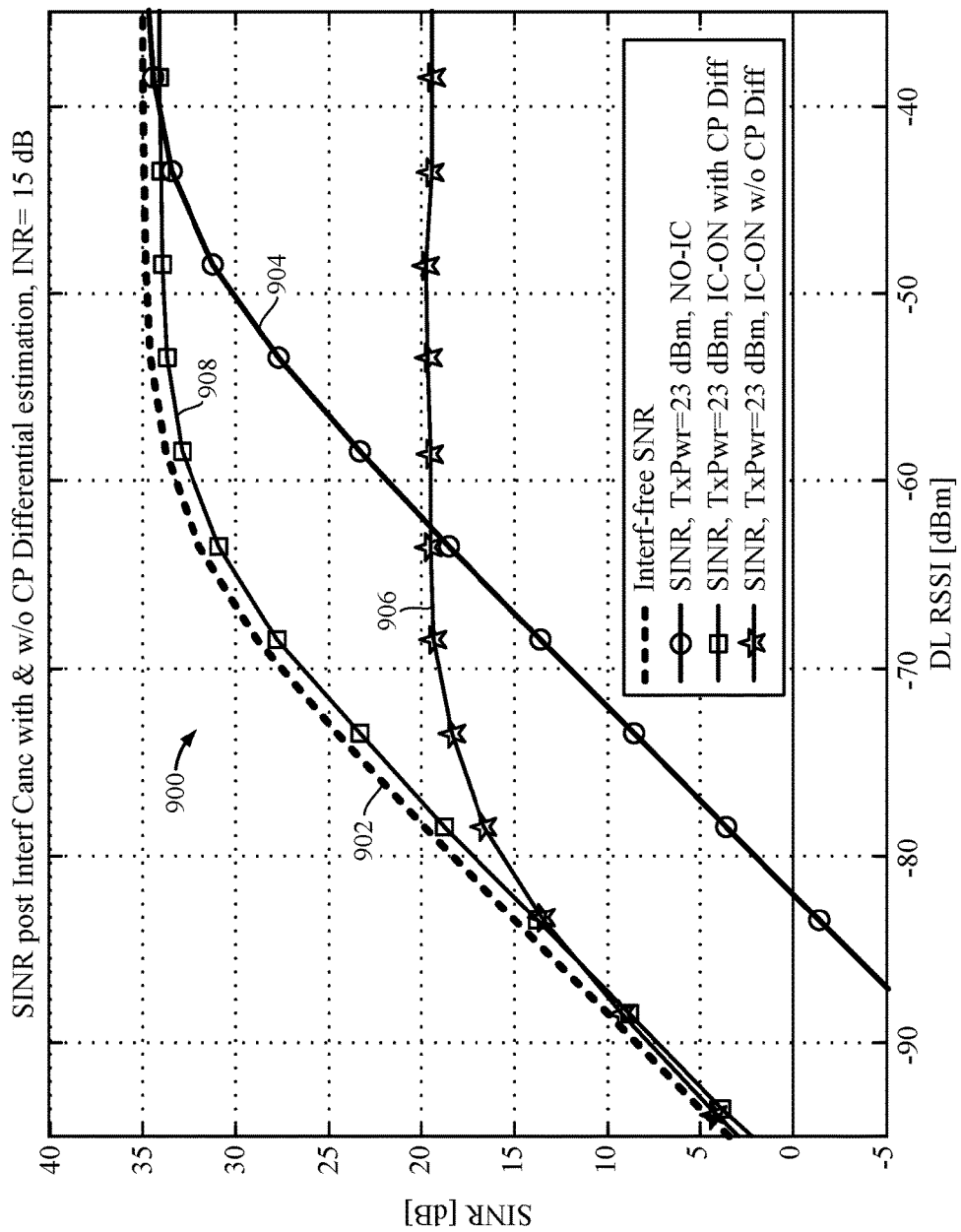
FIG. 9 illustrates relationships 900 between signal-to-noise-and-interference ratio (SINR) and downlink received signal strength indicator (RSSI) of a receive signal for various simulated communication scenarios, respectively, including a scenario implementing the improved mitigation of interference caused by a transmitter in accordance with certain aspects of the present disclosure.

FIG. 9 illustrates relationships 900 between signal-to-noise-and-interference ratio (SINR) and downlink received signal strength indicator (RSSI) of a receive signal for various simulated communication scenarios, respectively, including a communication scenario implementing the improved mitigation of interference caused by a transmitter in accordance with certain aspects of the present disclosure. Similar to FIG. 3, the communication scenarios include one or more communications scenarios in which a UE experiences interference like self-jamming interference. For example, the UE experiences self-jamming interference while receiving and transmitting using a transmit power of 23 dBm and for a transmission from the UE. For reference, curve 902 represents the relationship between SINR and downlink RSSI of a receive signal for an interference-free (e.g., self-jamming interference-free) or near-interference-free communication scenario. Curve 904 represents a simulated relationship between SINR and DL RSSI for a communications scenario in which a UE experiences self-jamming interference (e.g., having an INR of 15 dB) while receiving and transmitting using a transmit power of 23 dBm for a transmission from the UE but does not employ interference cancellation. Curve 906 represents a simulated relationship between SINR and DL RSSI for a communications scenario in which a UE experiences self-jamming interference (e.g., having an INR of 15 dB) while receiving and transmitting using a transmit power of 23 dBm for a transmission from the UE but employs interference cancellation (e.g., interference cancellation without the operations 600 for improved mitigation of interference caused by a transmitter which may include CP differential (CP Diff) estimation as described above).

Curve 908 represents a simulated relationship between SINR and DL RSSI for a communication scenario in which a UE experiences self-jamming interference (e.g., having an INR of 15 dB) while receiving and transmitting using a transmit power of 23 dBm for a transmission from the UE but employs operations 600 for improved mitigation of interference caused by a transmitter which may include CP differential (CP Diff) estimation as described above. Curve 908 closely tracks curve 902, which represents the relationship between SINR and downlink RSSI of a receive signal for an interference-free (e.g., self-jamming interference-free) or near-interference-free communication scenario. To wit, SINR post IC tracks the nominal one even at high RSSI. Further, in contrast to curve 906 which illustrates the ceiling effect, curve 908 illustrates a UE employing operations 600 for improved mitigation of interference caused by a transmitter outperforms a UE using interference cancellation without the operations 600 for improved mitigation of interference caused by a transmitter and also outperforms a UE not employing interference cancellation without the operations 600 for improved mitigation of interference caused by a transmitter for a range of RSSI including a range of RSSI above a threshold such as above −63 dBm. Thus, the operations 600 for improved mitigation of interference caused by a transmitter may reduce and/or avoid adversely effects caused by undesired projection of the receive signal on the interference cancellation components.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

In this manner, the present methods and apparatus may improve performance at high DL RSSI of any transmitter-(Tx-) self-jamming time domain (TD) cancellation scheme that employs an OFDM type of downlink (DL) waveform. In aspects, the present methods and apparatus may allow effective interference cancellation and hence SINR improvement for signals associated with a broader range of RSSI values, respectively (e.g., at low and high DL_RSSI values), and may restore the SNR of a desired or wanted receive signal to close to nominal conditions. In aspects, the present methods and apparatus provide improved mitigation of interference caused by a transmitter with limited complexity. For example, the modified desired signal and/or the conditioned filter basis of the present methods and apparatus may be determined using reduced logic and/or computational complexity (e.g., modifications to compute the CP differential via subtraction and to compute the associated filter basis modification via subtraction). In aspects, the present methods and apparatus to provide improved mitigation of interference may apply to any cancellation scheme or type that may requires 2nd order statistics estimation in a TD like interference spatial covariance matrix. In aspects, the present methods and apparatus to provide improved mitigation of interference may apply to other types of systems like to WLAN systems. The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of interference mitigation of wireless communication, comprising:
    transmitting at least one transmit signal from at least one transmit chain of a user equipment (UE) over a wireless medium;
    receiving a composite signal that includes a desired receive signal transmitted from a device and a distortion signal derived at least from the at least one transmit signal;
    generating a modified composite signal by removing at least a portion of the desired receive signal from the composite signal;
    determining adaptive filter coefficients based on the modified composite signal and an adaptive filter basis conditioned using a same operation employed to generate the modified composite signal from the composite signal;
    generating a distortion signal estimate based at least on the adaptive filter coefficients; and
    canceling the distortion signal estimate from the composite signal.

2. The method of claim 1, wherein the at least a portion of the desired receive signal corresponds to one or more portions of a cyclic prefix.

3. The method of claim 1, wherein the at least a portion of the desired receive signal is one or more end portions of a symbol in the desired receive signal.

4. The method of claim 1, wherein the adaptive filter basis is based on one or more samples of the at least one transmit signal.

5. The method of claim 1, wherein the adaptive filter coefficients represent at least one of effects of linear distortion, effects of non-linear distortion or an interference coupling channel.

6. The method of claim 1, wherein transmitting at least one transmit signal from at least one transmit chain of the UE over a wireless medium includes transmitting a first signal from a first transmit chain of the UE and transmitting a second signal from a second transmit chain of the UE.

7. The method of claim 1, wherein generating the modified composite signal, generating the distortion signal estimate, and canceling the distortion signal estimate are performed in response to an RSSI of the composite signal satisfying a threshold.

8. The method of claim 1, wherein the desired receive signal includes an OFDM waveform.

9. An apparatus for interference mitigation of wireless communication, comprising:
    a transmitter configured to transmit at least one transmit signal from at least one transmit chain of a user equipment (UE) over a wireless medium;
    a receiver configured to receive a composite signal that includes a desired receive signal transmitted from a device and a distortion signal, the receiver further configured to generate a modified composite signal by removing at least a portion of the desired receive signal from the composite signal; and
    an interference mitigator including an adaptive filter coefficient estimator configured to determine adaptive filter coefficients based on the modified composite signal and an adaptive filter basis conditioned using a same operation employed to generate the modified composite signal from the composite signal, the interference mitigator configured to generate a distortion signal estimate based at least on the adaptive filter coefficients, and the interference mitigator further configured to cancel the distortion signal estimate from the composite signal.

10. The apparatus of claim 9, wherein the at least a portion of the desired receive signal corresponds to one or more portions of a cyclic prefix.

11. The apparatus of claim 9, wherein the at least a portion of the desired receive signal is one or more end portions of a symbol in the desired receive signal.

12. The apparatus of claim 9, wherein the adaptive filter basis is based on one or more samples of the at least one transmit signal.

13. The apparatus of claim 9, wherein the adaptive filter coefficients represent at least one of effects of linear distortion, effects of non-linear distortion or an interference coupling channel.

14. The apparatus of claim 9, wherein the transmitter is configured to transmit a first signal from a first transmit chain of the UE and transmit a second signal from a second transmit chain of the UE.

15. The apparatus of claim 9, wherein the receiver is configured to generate the modified composite signal, and the interference mitigator is configured to generate and cancel the distortion signal estimate, in response to an RSSI of the composite signal satisfying a threshold.

16. An apparatus for interference mitigation of wireless communication, comprising:
    a processor; and
    memory in electronic communication with the processor, the memory embodying instructions, the instructions being executable by the processor to:
        transmit at least one transmit signal from at least one transmit chain of a UE over a wireless medium;

receive a composite signal that includes a desired receive signal transmitted from a device and a distortion signal;

generate a modified composite signal by removing at least a portion of the desired receive signal from the composite signal;

determine adaptive filter coefficients based on the modified composite signal and an adaptive filter basis conditioned using a same operation employed to generate the modified composite signal from the composite signal;

generate a distortion signal estimate based at least on the adaptive filter coefficients; and cancel the distortion signal estimate from the composite signal.

17. The apparatus of claim 16, wherein the at least a portion of the desired receive signal corresponds to one or more portions of a cyclic prefix.

18. A non-transitory computer-readable medium for interference mitigation of wireless communication, the non-transitory computer-readable medium storing computer-executable code for:

transmitting at least one transmit signal from at least one transmit chain of a user equipment (UE) over a wireless medium;

receiving a composite signal that includes a desired receive signal transmitted from a device and a distortion signal;

generating a modified composite signal by removing at least a portion of the desired receive signal from the composite signal;

determine adaptive filter coefficients based on the modified composite signal and an adaptive filter basis conditioned using a same operation employed to generate the modified composite signal from the composite signal;

generating a distortion signal estimate based at least on the adaptive filter coefficients; and canceling the distortion signal estimate from the composite signal.

19. The non-transitory computer-readable medium for wireless communication of claim 18, wherein the at least a portion of the desired receive signal corresponds to one or more portions of a cyclic prefix.

* * * * *